J. KEMNA.
REAMER.
APPLICATION FILED MAR. 24, 1919.

1,362,325.

Patented Dec. 14, 1920.

FIG. 1.

UNITED STATES PATENT OFFICE.

JOSEPH KEMNA, OF ONTARIO, CALIFORNIA.

REAMER.

1,362,325.  Specification of Letters Patent.  Patented Dec. 14, 1920.

Application filed March 24, 1919. Serial No. 284,786.

*To all whom it may concern:*

Be it known that I, JOSEPH KEMNA, a citizen of the United States, residing at Ontario, in the county of San Bernardino and State of California, have invented new and useful Improvements in Reamers, of which the following is a specification.

The objects of my invention are to provide a reamer adapted to be adjustable in the limit of depth to which it may cut and a novel means for holding the depth gage in position.

Figure 1 is a side elevation of a reamer embodying the principles of my invention.

Fig. 2 is an end elevation looking in the direction indicated by the arrows 2 in Figs. 1 and 3.

Fig. 3 is a diametrical sectional detail on the lines 3—3 of Figs. 1 and 2.

Fig. 4 is a cross section on the lines 4—4 of Figs. 1 and 3.

A straight round shank 1 has a diametrical pin hole 2 some distance from its end face 3. A cutter body 4 has a straight smooth bore 5 in which the shank 1 forms a sliding fit. The upper end of the body 4 has external screw threads 6 and the lower end has longitudinally extending cutting edges 7. A sleeve 8 has internal screw threads 9 fitting the threads 6. An annular rim 10 extends from one end of the sleeve 8 loosely around the cutting edges 7. Diametrically opposed slots 11 and 12 are formed through the sleeve 8 from the end opposite the rim 10, and a second pair of diametrically opposed slots 13 and 14 are formed through the sleeve 8 at right angles to the slots 11 and 12. An end face 15 of the rim 10 is adjustable relative to the face 16 of the body 4. A pin 17 is removably inserted through a pair of the slots 11 and 12, or 13 and 14, and through the pin hole 2, there being a diametrical pin hole 18 through the body 4 to receive the pin. The pin 17 holds the body 4 carrying the cutting edges 7 upon the shank 1, and when it is desired to adjust the reamer to cut to a certain depth from the end 16, the pin 17 is removed and the sleeve 8 screwed up or down to move the face 15 to the desired point, then the pin is inserted and the reamer operated, and the face 15 forms a stop to limit the depth to which the reamer will go.

Thus I have produced a reamer formed in two pieces, one piece being screwed upon the other, and there being means for holding the parts in their adjustable positions.

Various changes may be made without departing from the spirit of my invention as claimed.

I claim:

1. A reamer comprising a cutter member having cutting edges on its lower end and a pin hole through its upper end, and having a central bore, external screw threads upon the upper portion of the said cutter, a driving shank adapted to the central bore of the body and having a pin hole corresponding to the pin hole in the body, a stop sleeve, seated upon the screw threads of the body and having an end face forming a depth stop and having slots in its upper end adapted to engage a holding pin, and a driving and locking pin passing through the slots of the sleeve and the pin holes in the body and in the shank.

2. A reamer comprising, in combination, a cutter member having a threaded outer surface, a stop sleeve mounted on the member and adjustable along the threads thereon, a driving stem insertible in the cutter member, and means for locking the said parts and for holding the sleeve in given position on the member.

3. A reamer comprising in combination, a cutter member having a threaded outer surface, a stop sleeve mounted on the member and adjustable along the threads thereon, a driving stem insertible in the cutter member, and means for locking the said parts and for holding the sleeve in given position on the member, said means including a pin, the sleeve slotted longitudinally to receive the pin.

In testimony whereof I have signed my name to this specification.

JOSEPH KEMNA.